(12) United States Patent
Soentgerath et al.

(10) Patent No.: US 8,034,758 B2
(45) Date of Patent: *Oct. 11, 2011

(54) COATED SODIUM PERCARBONATE PARTICLES, PROCESS FOR THEIR PRODUCTION, THEIR USE AND DETERGENT COMPOSITIONS CONTAINING THEM

(75) Inventors: Alfred Soentgerath, Hausen (DE); Gerd Hecken, St. Katharinen (DE); Juergen H. Rabe, Rheinbrohl (DE); Henk L. J. Venbrux, Tervuren (BE)

(73) Assignee: SOLVAY (Societe Anonyme), Brussels (BG)

( * ) Notice: Subject to any disclaimer, the term of this patent is extended or adjusted under 35 U.S.C. 154(b) by 1042 days.

This patent is subject to a terminal disclaimer.

(21) Appl. No.: 11/630,890

(22) PCT Filed: Jun. 28, 2005

(86) PCT No.: PCT/EP2005/053041
§ 371 (c)(1),
(2), (4) Date: Jul. 10, 2007

(87) PCT Pub. No.: WO2006/003155
PCT Pub. Date: Jan. 12, 2006

(65) Prior Publication Data
US 2008/0108538 A1    May 8, 2008

(30) Foreign Application Priority Data
Jun. 29, 2004   (EP) .................................. 04103014

(51) Int. Cl.
*C11D 7/38*    (2006.01)
*C11D 7/54*    (2006.01)
*C11D 11/00*   (2006.01)

(52) U.S. Cl. ........ 510/349; 510/376; 510/438; 510/444; 510/445; 252/186.27

(58) Field of Classification Search .................. 510/349, 510/376, 438, 444, 445; 252/186.27
See application file for complete search history.

(56) References Cited

U.S. PATENT DOCUMENTS 3,917,663 A    11/1975  Kegelart et al.
4,135,010 A *  1/1979   Klebe et al. .................. 427/215
(Continued)

FOREIGN PATENT DOCUMENTS

BE    865 062      9/1978
EP    0 962 424    12/1999
GB    1 300 855    12/1972
GB    1 538 893    1/1979
(Continued)

OTHER PUBLICATIONS

U.S. Appl. No. 11/916,119, filed Nov. 30, 2007, Venbrux, et al.

*Primary Examiner* — Gregory R Del Cotto
(74) *Attorney, Agent, or Firm* — Oblon, Spivak, McClelland, Maier & Neustadt, L.L.P.

(57) ABSTRACT

Coated sodium percarbonate particles having a mean particle size of from 300 to 1600 μm containing a sodium percarbonate core surrounded by at least one coating layer, the coating layer comprising at least one coating agent and small sodium percarbonate particles of a mean particle size smaller than 100 μm. Process for the production of these particles by coating sodium percarbonate core particles with at least one coating agent and with small sodium percarbonate particles of a size smaller than 100 μm. Use of these particles as bleaching agent in detergent compositions and detergent compositions containing them.

22 Claims, 3 Drawing Sheets

| U.S. PATENT DOCUMENTS | | | |
|---|---|---|---|
| 4,428,914 A | 1/1984 | Brichard et al. | |
| 4,526,698 A | 7/1985 | Kuroda et al. | |
| 5,902,682 A | 5/1999 | Bertsch-Frank et al. | |
| 5,935,708 A | 8/1999 | Schuette et al. | |
| 6,054,066 A | 4/2000 | Honig et al. | |
| 6,113,805 A | 9/2000 | Schütte et al. | |
| 6,413,927 B1 * | 7/2002 | Horne et al. | 510/441 |
| 2001/0009311 A1 | 7/2001 | Assmann et al. | |
| 2003/0158069 A1 * | 8/2003 | Horne et al. | 510/375 |

| FOREIGN PATENT DOCUMENTS | | |
|---|---|---|
| RU | 21 64 215 | 3/2001 |
| WO | 96 14389 | 5/1996 |
| WO | 97 35806 | 10/1997 |
| WO | 97 35951 | 10/1997 |
| WO | 00 17 307 | 3/2000 |
| WO | 00 24 863 | 5/2000 |
| WO | 00 78915 | 12/2000 |
| WO | 01 62663 | 8/2001 |

* cited by examiner

COATED SODIUM PERCARBONATE PARTICLES, PROCESS FOR THEIR PRODUCTION, THEIR USE AND DETERGENT COMPOSITIONS CONTAINING THEM

This application is a 371 of PCT/EP05/53041, filed Jun. 28, 2005.

The present invention is related to coated sodium percarbonate particles presenting an improved stability.

The use of sodium percarbonate (or sodium carbonate peroxyhydrate) as bleaching agent in detergent compositions for household fabric washing or dish washing is well known. Commonly such detergent compositions contain among other components zeolites as builder material, enzymes, bleach activators and/or perfumes. However, the interaction between sodium percarbonate and other formulation components leads to progressive decomposition of the percarbonate and hence to loss of bleaching power during storage and transportation of the composition. A number of proposals have been made to overcome this problem by interposing a layer between the sodium percarbonate and its environment, called a coating layer. For instance, in the British patent application GB 1538893 sodium sulphate is used as one of the constituents of the coating layer, and in the international application WO 96/14389 a magnesium salt is used. In the U.S. Pat. No. 4,526,698 a borate is used. These known coating layers result already in an improved stability when the coated sodium percarbonate particles are used in a detergent formulation. However, this stability can still further be improved.

The aim of the present invention is to provide new coated sodium percarbonate particles presenting an improved long term stability when they are stored as such or in a formulated product for a long period before being used, compared to known coated sodium percarbonate particles.

Consequently, the invention concerns coated sodium percarbonate particles having a mean particle size of from 300 to 1600 µm containing a sodium percarbonate core surrounded by at least one coating layer, the coating layer comprising at least one coating agent and small sodium percarbonate particles of a mean particle size smaller than 100 µm.

Figure 1:
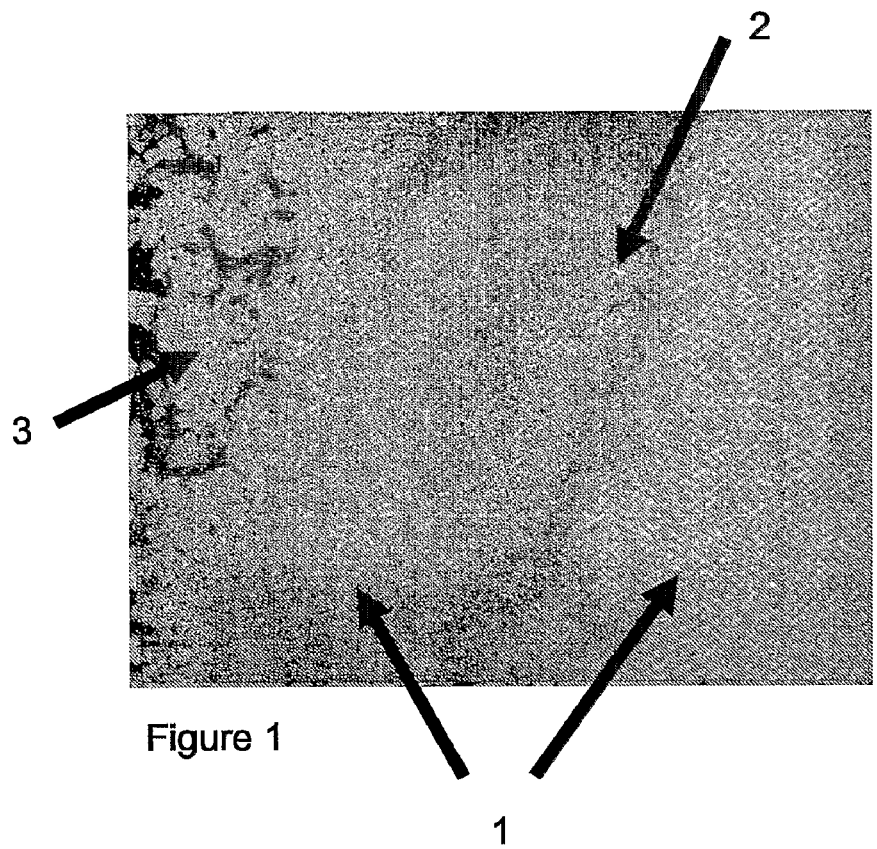
FIG. 1 shows a picture of coated sodium percarbonate containing small sodium percarbonate particles in the coating layer.
Figure 2:
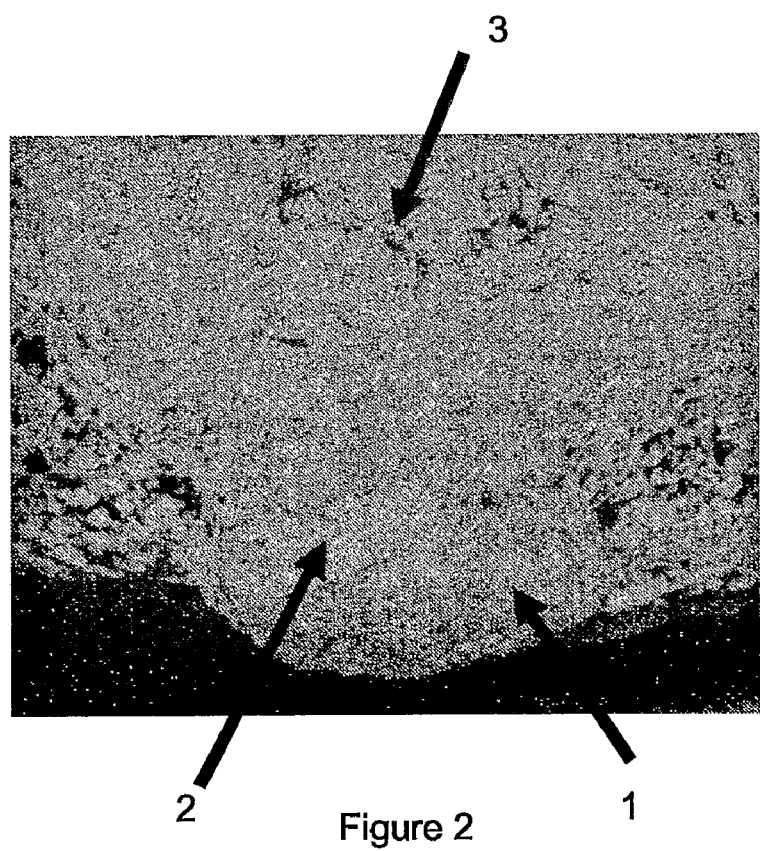
FIG. 2 shows a picture of coated sodium percarbonate containing small sodium percarbonate particles in the coating layer.

One of the essential characteristics of the present invention resides in the presence of small sodium percarbonate particles in the coating layer surrounding the sodium percarbonate core particles. Indeed, it has been observed that by introducing small sodium percarbonate particles into the coating layer, the stability of the coated sodium percarbonate particles, when they are stored for a long period before being used, is improved. The presence of these small particles in the coating layer can be detected by using Scanning Electron Microscopy—Energy Dispersive X-ray element mapping of an element which is present in the coating agent or in the small sodium percarbonate particles (but not in both) such as magnesium or sulphur, using the following equipment: FEI Quanta 200, EDX-System: Genesis from the company Edax, under the measurement conditions: High vacuum, 30 kV. FIGS. 1 and 2 show two typical pictures obtained with this method of coated sodium percarbonate containing small sodium percarbonate particles in the coating layer. In these figures, the area around 1 corresponds to the coating layer, 2 corresponds to a small sodium percarbonate particle inside the coating layer, and the area around 3 corresponds to the core particle.

The coated sodium percarbonate particles of the present invention have a mean particle size of at least 300 µm, in particular at least 400 µm, and more particularly at least 500 µm, values of at least 600 µm being especially advantageous. The mean particle size is at most 1600 µm, especially at most 1400 µm, values of at most 1000 µm being the most common, for instance at most 900 µm.

The sodium percarbonate core particles of the present invention can consist essentially of sodium percarbonate. They can contain sodium carbonate in an amount which usually does not exceed 15% by weight of the core particles, and/or they contain additives the amount of which usually does not exceed 2% by weight of the core particles. In a variant, the sodium percarbonate core particles can contain up to 4% by weight of a salt (such as sodium chloride), up to 10% by weight of sodium carbonate, and up to 4% by weight of additives. The additives can be stabilizers selected from inorganic stabilizers (such as alkali and soluble alkaline earth metal silicates) or organic stabilizers (such as polycarboxylate or polyphosphonate salts, as such or in acid form, for example polyaminocarboxylates like EDTA or DTPA, or polyaminomethylene-phosphonates like EDTMPA, CDTMPA or DTPMPA, or hydroalkylenephosphonates like hydroxyethylidenediphosphonate) or from mixtures of the above.

The sodium percarbonate core particles of the present invention generally have a mean diameter of at least 300 µm, in particular at least 400 µm, and more particularly at least 500 µm, values of at least 600 µm being especially advantageous. The mean diameter of the sodium percarbonate core particles is usually at most 1600 µm, especially at most 1400 µm, values of at most 1000 µm being the most common, for instance at most 900 µm.

According to the present invention, the sodium percarbonate core particles are surrounded by at least one coating layer. This means that the surface of the sodium percarbonate core particles has been treated, at least once, by contacting it with a coating agent or with a mixture of coating agents and small sodium percarbonate particles of a mean particle size smaller than 100 µm, so that a layer of that coating agent or mixture is deposited onto the surface of the core particles. It is recommended to have a coating layer as uniform and homogeneous as possible having all around the surface of the core particle a homogeneous chemical structure, a homogeneous thickness with as less holes as possible. The function of this coating layer is to protect the core material from contact with the environment and especially from contact with humidity present in the environment which enhances the decomposition of the core material.

The coating agent used in the present invention can be chosen from organic or inorganic coating agents. Inorganic coating agents are preferred. The inorganic coating agents can contain one or more materials selected from alkali metal and/or alkaline earth metal (particularly sodium or magnesium) salts of mineral or other inorganic acids. Typical examples include sulfate, carbonate, bicarbonate, phosphate and/or polymeric phosphates, silicates, borates and the corresponding boric acids. Particular combinations of coating agents include carbonate/silicate, and boric acid or borate with sulfate and the combination of a) sulfate, carbonate, carbonate/sulfate, bicarbonate, boric acid, borate, boric acid/sulfate, or borate/sulfate, with b) silicate. Preferably, the inorganic coating agent contains sodium silicate, sodium borate, boric acid, sodium carbonate, sodium sulfate, magnesium sulfate or one of their mixtures. The coating agent can also be sodium percarbonate itself, which can be applied as a solution of sodium percarbonate or by using simultaneously a solution of sodium carbonate and a solution of hydrogen peroxide.

The small sodium percarbonate particles used in the present invention have a mean particle size smaller than 100 µm, in particular smaller than 90 µm, more particularly smaller than 80 µm, values smaller than 70 µm giving good results. Usually, the small sodium percarbonate particles have a mean particle size of at least 1 µm, especially at least 5 µm, and most often at least 10 µm. Generally, at least 90 (in particular at least 95, and more particularly at least 99) % by weight of the small sodium percarbonate particles have a diameter below 250 µm (especially below 220 µm, and most preferably below 200 µm).

The mean particle size of particles is measured using a sieve set (containing at least 6 sieves of known sieve aperture) to obtain several fractions and weighing each fraction. The mean particle size in µm (MPS) is then calculated according to the formula $$MPS = 0.005 \sum_{i=0}^{n} [m_i(k_i + k_{i+1})]$$

in which n is the number of sieves (not including the sieve pan), $m_i$ is the weight fraction in % on sieve i and $k_i$, is the sieve aperture in µm of sieve i. The index i increases with increasing sieve aperture. The sieve pan is indicated with the index 0 and has an aperture of $k_0$=0 µm and $m_0$ is the weight retained in the sieve pan after the sieving process. $k_{n+1}$ equals to 1800 µm and is the maximum size considered for the MPS calculation. A typical sieve set which gives reliable results is defined as follows: n=6; $k_6$=1400 µm; $k_5$=1000 µm; $k_4$=850 µm; $k_3$=600 µm; $k_2$=425 µm; $k_1$=150 µm.

The small sodium percarbonate particles used in the present invention can be uncoated. Alternatively, they can be coated.

The content of small sodium percarbonate particles in the coating layer is generally at least 1% by weight, in particular at least 5% by weight, values of at least 10% by weight being preferred, those of about 15% by weight being most preferred. The content is usually at most 40% by weight, especially at most 30% by weight, values of at most 20% by weight being advantageous.

The coating layer present in the coated sodium percarbonate particles of the present invention represents in general at least 0.1% by weight of the coated sodium percarbonate particles, in particular at least 0.5% by weight and most preferably at least 1% by weight. The coating layer represents in many cases at most 50% by weight of the coated sodium percarbonate particles, especially at most 35% by weight, and most often at most 20% by weight. Amounts of from 0.1 to 50% by weight give good results.

The coated sodium percarbonate particles of the invention have an improved stability, and especially an improved long term stability. This long term stability can be expressed in two different ways. According to the first way, it is expressed as heat output at 40° C. measured after storage of 1 g of the product during 12 weeks at 40° C. in a closed ampoule of 3.5 ml. The measurement of heat output by microcalorimetry consists of using the heat flow or heat leakage principle using a LKB2277 Bio Activity Monitor. The heat flow between an ampoule containing the coated sodium percarbonate particles and a temperature controlled water bath is measured and compared to a reference material with a known heat of reaction. This long term stability is generally less than 5 µW/g, in particular less than 4 µW/g, preferably less than 3 µW/g, and most preferably less than 2 µW/g.

According to the second way, the long term stability is expressed as the Avox (or available oxygen content) recovery after storage of 1 g of the product for 8 weeks at 55° C. in a closed ampoule of 3.5 ml. The Avox recovery corresponds to the difference between the available oxygen content before and after the storage expressed as percentage of the initial available oxygen content. The available oxygen content is measured as explained below. This Avox recovery is in many cases at least 70%, especially at least 75%, values of at least 80% being very suitable, those of at least 85% being preferred.

The coated sodium percarbonate particles of the invention have usually a content of available oxygen of at least 12.0% by weight, in particular at least 13.0% by weight, contents of at least 13.5% by weight being particularly satisfactory. The content of available oxygen is generally at most 15.0% by weight, in particular at most 14.0%, for instance at most 14.4%. The content of available oxygen is measured by titration with potassium permanganate after dissolution in sulfuric acid (see ISO standard 1917-1982).

The coated sodium percarbonate particles of the present invention usually have a 90% dissolution time of at least 0.1 min, in particular at least 0.5 min. Generally, the 90% dissolution time is at most 3 min, especially at most 2.5 min. The 90% dissolution time is the time taken for conductivity to achieve 90% of its final value after addition of the coated sodium percarbonate particles to water at 15° C. and 2 g/l concentration. The method used is adapted from ISO 3123-1976 for industrial perborates, the only differences being the stirrer height that is 10 mm from the beaker bottom and a 2 liter beaker (internal diameter 120 mm). The coated sodium percarbonate particles of the present invention usually have a bulk density of at least 0.8 g/cm³, in particular at least 0.9 g/cm³. It is generally at most 1.2 g/cm³, especially at most 1.1 g/cm³. The bulk density is measured by recording the mass of a sample in a stainless steel cylinder of internal height and diameter 86.1 mm, after running the sample out of a funnel (upper internal diameter 108 mm, lower internal diameter 40 mm, height 130 mm) placed 50 mm directly above the cylinder.

The coated sodium percarbonate particles of the invention usually have an attrition measured according to the ISO standard method 5937-1980 of at most 10%, in particular at most 8%, especially at most 4%. The attrition is in most cases at least 0.05%.

The coated sodium percarbonate particles of the invention generally have an in-detergent stability of at least 60% Avox recovery, in particular at least 65%. The in-detergent stability is often at most 95% Avox recovery, especially at most 85%. The in-detergent stability is measured as follows: a detergent composition is prepared by dry mixing 15% by weight of coated sodium percarbonate particles with 90% by weight of a base detergent composition containing zeolite A (Na) called IECA* base in an amount of about 35% by weight. Samples (50 g) of the blended composition are transferred into polyethylene-coated cartons which were sealed and the cartons stored in a temperature and humidity controlled cabinet at 32° C., 80% relative humidity for 6 weeks. The available oxygen content (Avox) of the composition was measured at the beginning and end of the storage period, using a standard potassium permanganate titration method and the Avox remaining at the end expressed as a percentage of its starting value is calculated.

The coated sodium percarbonate particles of the invention present in general a moisture pick-up when measured in a test conducted in a humidity chamber at 80% relative humidity and 32° C. after 24 hours, which varies from 0.1 to 25% of the weight of the sample. It varies in particular from 0.5 to 3% of the weight of the sample, and is preferably from 1 to 1.5% of the weight of the sample. The moisture pick-up is the extent/rate at which the product picks up moisture from a humid atmosphere. This capability to pick up moisture is measured by the following test: a 9 cm diameter Petri dish with a 1 cm depth rim is weighed accurately on a 4 decimal place balance, (W1). A sample of dry sodium percarbonate (about 5 g) is placed on the Petri dish which is gently agitated to generate an even particulate layer across the base of the dish and reweighed on the same balance, (W2). The sample on the Petri dish is stored in a room, about 2.5 m high, wide and long in an atmosphere maintained for a period of 24 hours at 32° C. by a thermostat controlled heater and at 80% Relative Humidity (RH) by introduction of a fine droplet water spray under the control of a humidity detector and weighed on the same balance, (W3). The samples are protected by a shield from the spray. The moisture pick-up is calculated as follows:

Moisture Pick-up $(g/kg)=1000\times(W3-W2)/(W2-W1)$. "Dry sodium percarbonate" is intended to denote sodium percarbonate which has been dried until its moisture content is below 0.3% by weight (using a Halogen dryer METTLER HR73 equipment, in which a cooled sample of about 7.5 g is placed on an aluminum dish, the sample is continuously weighed and dried at 60° C. until the weight is constant (maximum weight loss of 1 mg in 90 s). The drying can be done for instance in a fluid bed drier having a diameter of 15 cm, during 15 to 30 min, for 2 kg of product, at a temperature of 50 to 90° C. (for example 70° C.) and an air flow of 100 to 150 m$^3$/h. After the 24 hour storage, the sample has to be weighed within 5 min and at ambient conditions (temperature of 22° C. and relative humidity of 34%).

The coated sodium percarbonate particles of the present invention can be prepared by any adequate method which allows the coating of core particles with a coating agent combined with small sodium percarbonate particles of a mean particle size smaller than 100 μm.

The present invention is therefore also related to a process for producing the above-described coated sodium percarbonate particles. The process according to the present invention comprises a manufacturing step of sodium percarbonate core particles followed by a coating step of the sodium percarbonate core particles with at least one solution or suspension of at least one coating agent and with small sodium percarbonate particles of a mean particle size smaller than 100 μm, in order to obtain the coated sodium percarbonate particles. In particular, the two processes defined hereafter give good results.

First Process of the Invention

According to a first particular process of the invention, the process comprises the following steps:
  (a) a manufacturing step of sodium percarbonate core particles,
  (b) a drying step of the so obtained sodium percarbonate core particles,
  (c) a coating step of the so obtained dried sodium percarbonate core particles with at least one solution or suspension of at least one coating agent and with small sodium percarbonate particles of a mean particle size smaller than 100 μm, in order to obtain coated sodium percarbonate particles,
  (d) a drying step of the so obtained coated sodium percarbonate particles.

The first step (a) for the manufacture of sodium percarbonate core particles can be carried out by any known process for the preparation of sodium percarbonate core particles. According to a first option, step (a) can be a liquid crystallization process, in which a solution of sodium carbonate is mixed with a solution of hydrogen peroxide and the formed sodium percarbonate is precipitated into sodium percarbonate core particles, for instance by lowering the temperature and/or by adding salting out agents. The sodium percarbonate core particles are separated from the liquid by for example centrifugation or filtration. An example of such a liquid crystallization process is described in the international application WO 97/35806 of SOLVAY INTEROX.

According to a second option, step (a) uses a fluid bed granulation process, in which a solution of sodium carbonate and a solution of hydrogen peroxide are sprayed onto a bed of sodium percarbonate seeds which is fluidized with the aid of a fluidizing gas, the carbonate and the hydrogen peroxide react on the surface of the seed particles, the seed particles thereby grow into sodium percarbonate core particles. An example of such a fluid bed granulation process is described in GB 1300855 of SOLVAY.

According to a third option, step (a) can be a direct process by reaction of a hydrogen peroxide solution with solid sodium carbonate and/or bicarbonate. An example of such a direct process is described in the U.S. Pat. No. 6,054,066 of SOLVAY INTEROX GmbH.

The sodium percarbonate core particles obtained according to the first option of step (a) (lioaid crystallization process) contain commonly more than 1% by weight of water, the water content being generally up to 15% by weight. The core particles obtained according to the second option (fluid bed granulation process) contain in general less than 1.5% by weight of water, in particular less than 1% by weight of water, a water content of at most 0.8% by weight being most preferred. The core particles obtained according to the third option (direct process) contain typically between 0.1 and 25% by weight of water.

The water content of sodium percarbonate particles is measured, in the framework of the present invention, according to the following method: a sample is heated and the amount of liberated water is measured by the METTLER method described above.

The drying step (b) of the process of the present invention can be a distinct step from step (a) or can be carried out simultaneously with step (a) in the same equipment. When step (a) is carried out according to the first option (liquid crystallization process), then the drying step (b) can be done in any reactor such as in a fluid bed drier, in a rotating drum drier, in an oven or in a circulating air oven. A fluid bed drier, in which the sodium percarbonate core particles are fluidized by an upward flow of fluidizing gas (such as air, preferably hot air), is preferred. Typical temperatures of the hot air are from 50 to 210° C., especially from 100 to 160° C.

If step (a) is carried out according to the second option (fluid bed granulation process), the drying is usually done in the same fluid bed reactor as the one used in step (a). Drying is then simultaneously carried out with step (a). Typical temperatures of the fluidizing gas are from 50 to 210° C., especially from 100 to 160° C.

When step (a) is carried out according to the third option (direct process), the drying can be done in any reactor such as a rotating drum drier, an oven, a circulating air oven or a fluid bed reactor which can be the same as the fluid bed reactor used in step (a). Typical temperatures of the fluidizing gas are from 50 to 210° C., especially from 100 to 160° C.

The dried sodium percarbonate core particles obtained in step (b) contain in general less than 1.5% by weight of water, in particular less than 1% by weight of water, a water content of at most 0.8% by weight being most preferred.

The coating step (c) of the process of the present invention can be carried out by any adequate coating process which allows bringing the dried sodium percarbonate core particles in contact with the coating agent and with the small sodium percarbonate particles of a mean particle size smaller than 100 μm. Any type of mixer or fluid bed reactor can be used for this purpose as coating equipment. A mixer is preferred, especially those containing a mixing drum with rotating tools such as those of the LOEDIGE type.

In step (c), the coating agent can be used in the form of a solution (preferably an aqueous solution) or in the form of a slurry, or else in powder form. The use of a coating agent in powder form is described in the international application WO 01/62663 of SOLVAY (Societe Anonyme). Solutions of the coating agent are preferred, especially aqueous solutions.

In step (c), the small sodium percarbonate particles can be added to the coating equipment in powder form or in the form of a slurry. The powder form is preferred. It can be added at the same time as the coating agent or before or after. It is preferred to add the small sodium percarbonate particles at the same time as the coating agent. The small sodium percarbonate particles can be added to the coating equipment through the same feeding device as the coating agent or through a separate feeding device. A separate feeding device is preferred.

During step (c), it is recommended to have a minimum amount of moisture present in the system to allow to bind the coating layer onto the surface of the core particles and/or to glue the small particles onto the surface of the core particles or in the coating layer. This moisture can already be present inside the sodium percarbonate core particles. It can also be added as the diluent of the aqueous solution or slurry of the coating agent or as the diluent of the slurry of the small sodium percarbonate particles, or else it can be added as such. In the case of coating in a mixer, the moisture content is usually at least 2% by weight of the weight of the dried sodium percarbonate core particles, in particular at least 3% by weight, preferably at least 5% by weight. The moisture content can go up to 30% by weight of the weight of the dried sodium percarbonate core particles, especially up to 20% by weight, in most cases up to 15% by weight. In the case of coating in a fluid bed reactor, the moisture content can be lower.

Step (c) of the process of the invention is generally carried out at a temperature of at least 20° C. The temperature is in many cases at most 80° C., and especially at most 65° C.

In a particular form of realisation of step (c), the coating agent is sodium percarbonate and is applied in a fluid bed reactor onto the surface of the core particles by spraying thereon a solution of sodium percarbonate or simultaneously a solution of sodium carbonate and a solution of hydrogen peroxide. Small sodium percarbonate particles are then introduced at the same time.

The drying step (d) of the process of the invention can be carried out under similar conditions as the drying step (b). When the coating step (c) is carried out in a fluid bed reactor, then the drying step (d) is preferably carried out simultaneously with the coating step (c) in the same fluid bed equipment.

The small sodium percarbonate particles used in the coating step (c) can be obtained in different ways.

In a first variant, they are obtained in a separate process for the production of sodium percarbonate particles. In this case, they can be obtained directly as final product of that separate process or they can be obtained by sieving the final product so as to obtain the requested mean particle size smaller than 100 μm.

In a second variant, which is a particularly advantageous embodiment of the process of the present invention, the small sodium percarbonate particles are obtained by removing some of the particles generated during the process of the present invention and by recycling them into step (c).

In a first case of the second variant, the process of the present invention can contain in addition, between steps (b) and (c) and/or after (d), at least one sieving step in order to remove particles of a size smaller than 600 μm and/or larger than 1800 μm, followed by milling these removed particles into small particles of a mean size smaller than 100 μm, and introducing these small particles in step (c). The sieving can be done by any known way, for instance by using sieves presenting apertures of a diameter of 600 or 1800 μm. Sometimes, it can be useful to remove particles of a size smaller than 500 μm, in special cases smaller than 300 μm. Removing particles of a size larger than 1500 μm can be possible, even larger than 1200 μm. The milling can be done in any milling equipment such as a pin mill or a jet mill for example the ALPINE 400 CW mill.

In a second case of the second variant, the small sodium percarbonate particles are obtained by collecting the fines (with the aid of a filter, a cyclone or a combination thereof) carried along with the fludizing gas used in the fluid bed drier and by recycling these fines, optionally after milling, into the coating step (c). According to this second case, step (b) and/or step (d) is carried out in a fluid bed drier using a fluidizing gas, fine PCS particles are carried along with the fluidizing gas out of the fluid bed drier and are recycled, optionally after milling, in step (c).

The two cases of the second variant can of course be combined.

In the process of the present invention, it can further be advantageous to add at least one additional coating step between steps (c) and (d). This is particularly useful when the additional coating step(s) is (are) carried out in a fluid bed reactor.

Figure 3:
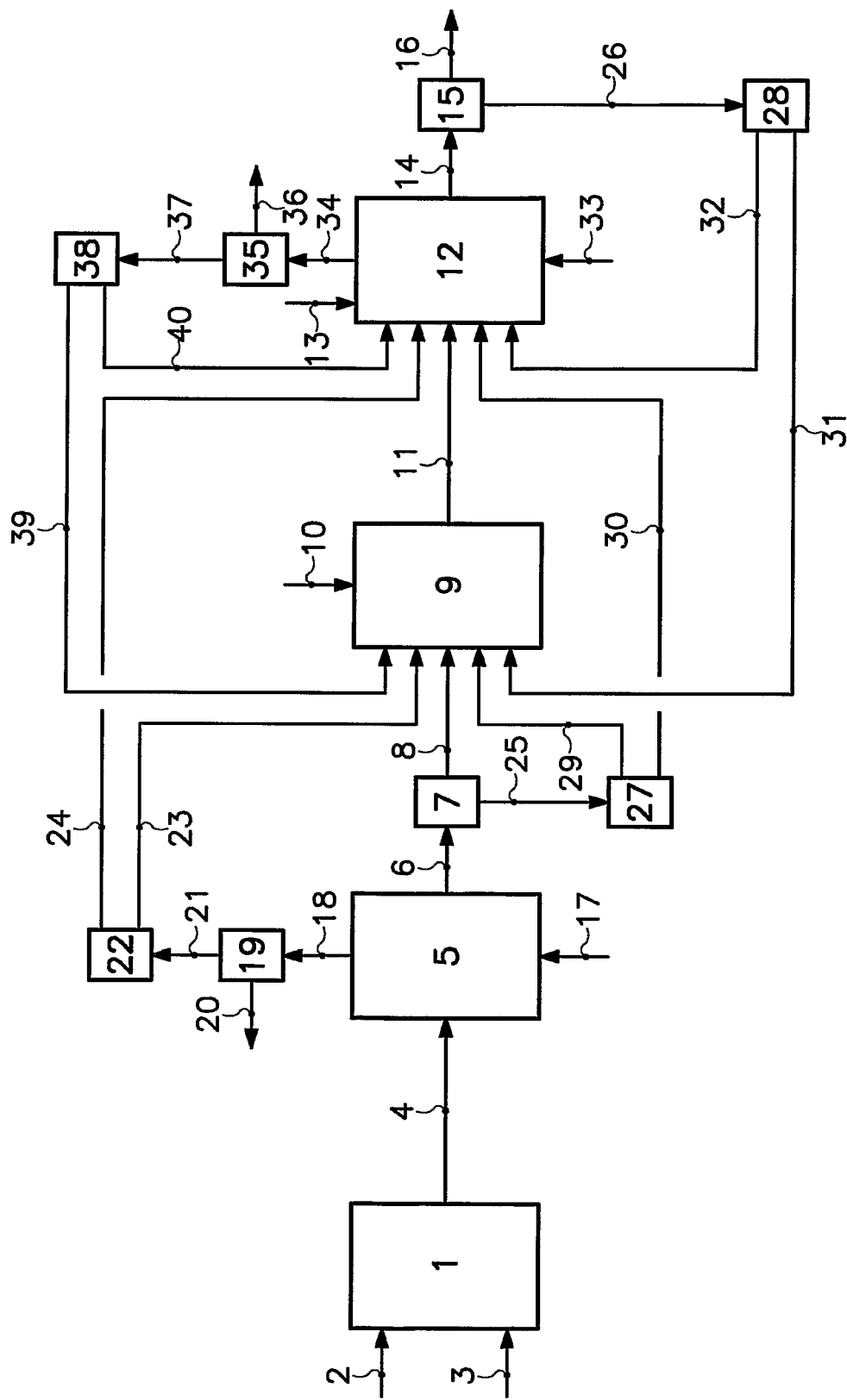
FIG. 3 shows a preferred realization form of the process of the invention.

A particularly preferred realization form of the process of the invention is represented in the FIG. 3. A reactor 1 for the manufacture of sodium percarbonate core particles is fed with a carbonate source through the conduit 2 and with a hydrogen peroxide source (preferably an aqueous hydrogen peroxide solution) through the conduit 3. The reactor 1 is preferably a liquid crystallization reactor. The obtained sodium percarbonate core particles are transferred from the reactor 1 to a drier 5 through the conduit 4, in which they are dried. The thus obtained dried sodium percarbonate core particles are transferred via the conduit 6 to a sieving device 7 and the sieved particles are further transferred via the conduit 8 into the coating reactor 9. The coating agent is introduced in the coating reactor 9 through the conduit 10. Small sodium percarbonate particles are introduced in the coating reactor 9 through one or more of the conduits 23, 29, 31 and 39. This is explained in detail below. The coated sodium percarbonate particles leave the coating reactor 9 through conduit 11 and can be introduced in a fluid bed drier 12 which can simultaneously act as second coating reactor which is fed with a coating agent (different or the same as in the first coating reactor) through the conduit 13. The second coating reactor 12 can also be fed with small particles through one or more of the conduits 24, 30, 32 and 40, as explained in detail below. The (optionally double) coated sodium percarbonate particles are then transferred through the conduit 14 into a sieving device 15. The final sieved coated sodium percarbonate particles leave the process through the conduit 16 and are collected as final product.

In a first embodiment, the small sodium percarbonate particles used in the coating step are recycled from the drying step (b) carried out in drier 5 as follows. The drier 5 is in this case a fluid bed drier using an upward flow of fluidizing gas entering the fluid bed via the conduit 17. The fluidizing gas leaves the drier 5 at the top through the conduit 18 and carries along fine sodium percarbonate particles. These fine particles are removed from the stream leaving the drier 5 through the conduit 18 with the aid of the separating device 19. The fluidizing gas leaves via the conduit 20. The thus removed particles are transferred through the conduit 21 into an optional milling device 22 in which particles of a mean size smaller than 100 µm are obtained. These milled particles are then transferred through the conduits 23 and/or 24 and introduced in the first and/or second coating reactors 9 and/or 12.

In a second embodiment, the small sodium percarbonate particles used in the coating step are recycled from the sieving devices 7 and/or 15. In these sieving devices, particles with a size smaller than 300 µm and particles larger than 1800 µm are separated from the others. The others continue in the process as explained above. The separated particles (smaller than 300 and larger than 1800 µm) are transferred via the conduits 25 and/or 26 into the milling devices 27 and/or 28 in which particles of a mean size smaller than 100 µm are obtained. These small particles are transferred via the conduits 29, 30, 31 and/or 32 and introduced in the first and/or second coating reactors 9 and/or 12.

In a third embodiment, the small sodium percarbonate particles used in the coating step are recycled from the drying step (d) carried out in drier 12 as follows. The drier 12 is in this case a fluid bed drier using an upward flow of fluidizing gas entering the drier through the conduit 33. The fluidizing gas leaves the drier 12 at the top through the conduit 34 and carries along fine coated sodium percarbonate particles. These fine particles are removed from the stream leaving the drier 12 through the conduit 34 with the aid of the separating device 35. The fluidizing gas leaves through the conduit 36. The thus removed particles are transferred through the conduit 37 into an optional milling device 38 in which particles of a mean size smaller than 100 µm are obtained. These milled particles are then transferred through the conduits 39 and/or 40 and introduced in the first and/or second coating reactors 9 and/or 12.

The first, second and third embodiments can be combined.

Second Process of the Invention

According to a second process of the invention, it comprises the following steps:

(a) a manufacturing step of sodium percarbonate core particles (b) a combined drying and coating step in a fluid bed reactor of the so obtained sodium percarbonate core particles with at least one solution or suspension of at least one coating agent and with small sodium percarbonate particles of a mean particle size smaller than 100 µm, in order to obtain coated sodium percarbonate particles.

The steps (a) and (b) can be carried out in the same conditions as explained before for the first process of the invention. Likewise, an additional coating step can be added as explained before.

Figure 4:
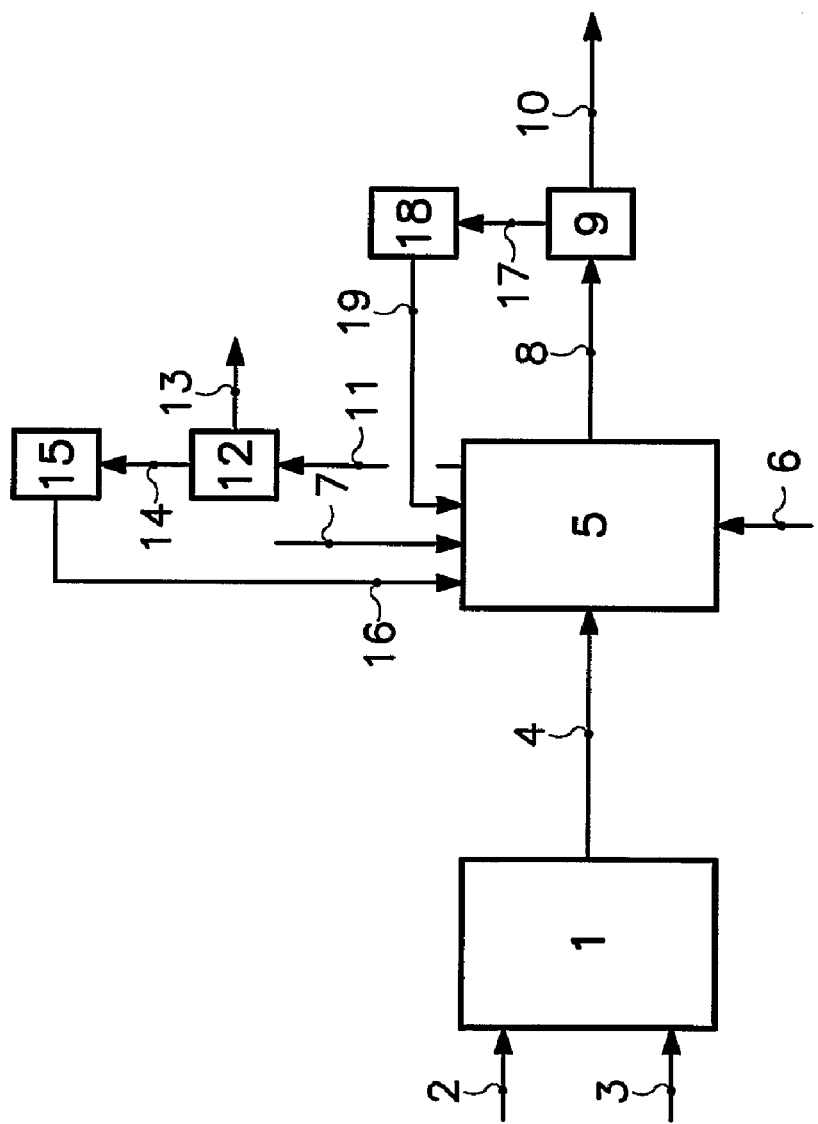
FIG. 4 shows a preferred realization form of the process of the invention.

A particularly preferred realization form of the second process of the invention is represented in the FIG. 4. A reactor 1 for the manufacture of sodium percarbonate core particles is fed with a carbonate source (preferably an aqueous solution of sodium carbonate) through the conduit 2 and with a hydrogen peroxide source (preferably an aqueous hydrogen peroxide solution) through the conduit 3. The reactor 1 is preferably a liquid crystallization reactor. The obtained sodium percarbonate core particles are transferred from the reactor 1 via the conduit 4 to a fluid bed reactor 5 which acts simultaneously as coating reactor and as drier. The fluidizing gas is entered into the fluid bed 5 via the conduit 6. The coating agent is introduced in the fluid bed reactor 5 via the conduit 7. Small sodium percarbonate particles are introduced in the fluid bed reactor 5 through one or both of the conduits 16 and 19 as explained in detail below. The coated and dried sodium percarbonate particles leave the fluid bed reactor 5 via the conduit 8 and are transferred to a sieving device 9 which eliminates the too small and too large particles in order to obtain particles with a mean size of from 300 to 1800 µm which are collected as final product via the conduit 10.

In a first embodiment, the small sodium percarbonate particles used in the coating step are recycled from the coating step itself as follows. The fluid bed coating reactor uses an upward flow of fluidizing gas entering the reactor through the conduit 6. The fluidizing gas leaves the reactor 5 at the top through the conduit 11 and carries along fine coated sodium percarbonate particles. These fine particles are removed from the stream leaving the reactor 5 through the conduit 11 with the aid of the separating, device 12. The fluidizing gas leaves through the conduit 13. The thus removed particles are transferred through the conduit 14 into the milling device 15 in which particles of a mean size smaller than 100 µm are obtained. These milled particles are then transferred through the conduit 16 and re-introduced in the coating reactor 5.

In a second embodiment, the small sodium percarbonate particles used in the coating step are recycled from the sieving device 9. In this sieving device, particles with a size smaller than 300 µm and particles larger than 1800 µm are separated from the others. The others continue in the process as explained above. The separated particles (smaller than 300 and larger than 1800 µm) are transferred via the conduit 17 into a milling device 18 in which particles of a mean size smaller than 100 µm are obtained. These small particles are transferred via the conduit 19 and introduced in the coating reactor 5.

The first and second embodiment can be used simultaneously. The coated sodium percarbonate particles of the present invention can advantageously be used as bleaching agent in detergent compositions.

The present invention therefore concerns also the use of the above described coated sodium percarbonate particles as bleaching agent in detergent compositions.

The present invention also concerns detergent compositions containing the above described coated sodium percarbonate particles. They can also contain a builder, either zeolitic or non-zeolitic (such as phosphate builders). Other possible constituents of the detergent compositions can be surfactants, anti-redeposition and soil suspension agents, bleach activators, optical brightening agents, soil release agents, suds controllers, enzymes, fabric softening agents, perfumes, colours and processing aids. The detergent compositions can take the form of powders, granules, tablets and liquids. The powders and granules have preferably a bulk density of 0.2 to 1.4 µg/cm$^3$.

EXAMPLE 1

Sodium percarbonate core particles were prepared in a continuous crystallization process using NaCl as salting out agent in a concentration of about 200 g/l. The crystallization reactor was filled with mother liquor at a temperature between 15 and 25° C. Solid sodium carbonate was added thereto until saturation was obtained as well as a slight excess of a 60% wt aqueous hydrogen peroxide solution. The reactor was continuously stirred and cooled at a temperature of 15-25° C.

The formed sodium percarbonate core particles are continuously withdrawn from the reactor and transferred into a buffer tank and then into a discontinuous centrifuge. The sodium percarbonate core particles leaving the centrifuge are dried in a fluid bed dryer at an off-gas temperature between 50 and 75° C.

3 kg of the so obtained uncoated sodium percarbonate core particles (PCS) with a mean particle size of 676 μm and a span of 1.16 were separated by sieving with a Tumbler screening machine IFA-T Model: MR 24 S600-5-5-5 into two fractions with a cut at 600 μm.

The span of a particle size distribution was measured using the sieve set containing 6 sieves described above to obtain several fractions and weighing each fraction. The span was then calculated according to the formula $$\text{Span} = 2{,}563 \frac{0{,}1 \sqrt{\sum_{i=0}^{n} \left[ m_i \left( \frac{k_i + k_{i+1}}{2} - MPS \right)^2 \right]}}{MPS}$$

in which n: number of sieves (not including sieve pan),
$m_i$: weight fraction in % on sieve i
$k_i$: sieve aperture in μm of sieve i
index i increases with increasing sieve aperture The sieve pan is indicated with the index 0, has an aperture of $k_0$=μm and $m_0$:is the weight retained in the sieve pan after the sieving process.

$k_{n+1}$=1800 μm and is the maximum size of particles considered for the span calculation.

MPS is the mean particle size as calculated according to the description above.

The fraction below 600 μm was milled with a cross-beater mill of the type Retsch SK100. After milling, the mean particle size was 23 μm and the span 2,9.

1750 g PCS of the fraction above 600 μm and 650 g of the milled PCS are filled into a plough shear mixer of the type Lödige with cutter Typ M5 RMK.

271.4 g of a coating solution [containing 171.1 g of a borate-silicate solution and 100.3 g water] was added thereto.

The whole mixture was granulated at 150 rpm using the cutter.

The calculated humidity of the mixture was 7%.

The granulated product was taken out of the mixer and transferred into a lab fluid bed coater/dryer of the Glatt type and dried to an off-gas temperature of 85° C.

An additional 181.9 g of the same coating solution were sprayed on the PCS in the fluid bed.

The conditions used in the fluid bed coater/dryer were:

| | |
|---|---|
| Nozzle: | Spraying top down onto the PCS |
| Spraying air: | 2.5 bar absolute |
| Air temperature: | 90-105° C. |
| Air flow | 120 ± 10 m³/h |
| Off gas: | During coating: 70-80° C. |
| Final drying: | up to 85° C. |

Reaching an off-gas temperature of 85° C., the final product was taken out of the dryer and cooled.

The total coating level was 6% by weight of the weight of the coated sodium percarbonate particles. The coating layer contained 20% by weight of PCS fines. The obtained coated PCS presented a long term stability expressed as heat output at 40° C. measured after storage during 12 weeks at 40° C. of less than 2 μW/g, and expressed as Avox recovery after storage for 8 weeks at 55° C. of 88%.

EXAMPLE 2

The same operations as above have been repeated except that the coating was done as follows: 2000 g of the fraction of PCS above 600 μm were mixed with 500 g of the milled material in a LOEDIGE mixer (cutter in use) and 320 g of a solution of sodium sulfate and silicate (200 g $Na_2SO_4$/50 g $SiO_2$/25 g $Na_2O$/kg). The resulting product was taken out of the mixer and transferred into a lab fluid bed coater/dryer of the Glatt type and dried. An additional 272.5 g of the same coating solution were sprayed on 1500 g of the dried PCS in the fluid bed. The conditions used in the fluid bed/dryer were:

| | |
|---|---|
| Nozzle: | spraying top down onto the PCS |
| Spraying air: | 2.5 bar absolute |
| Air temperature: | 90-105° C. |
| Air flow: | 120 m³/h |
| Off gas: | During coating: 70-80° C. |
| Final drying: | up to 85° C. |

The final product contained a coating layer with 25% by weight (of the weight of the coating layer) of small sodium percarbonate particles. The coating layer represented 5.7% by weight of the final product. The final product showed a mean particle size of 1036 μm with a span of 0.79. FIGS. 1 and 2 show SEM-EDX pictures of the final product. These figures are commented before.

The invention claimed is:

1. A process for producing coated sodium percarbonate particles having a mean particle size of from 300 to 1600 μm comprising coating sodium percarbonate core particles with at least one solution or suspension of at least one coating agent and with sodium percarbonate particles having a mean particle size smaller than 100 μm, in order to obtain the coated sodium percarbonate particles having a mean particle size of from 300 to 1600 μm.

2. The process according to claim 1, in which said coated sodium percarbonate particles produced have a coating layer that represents from 0.1 to 50% by weight of the coated sodium percarbonate particles.

3. The particles process according to claim 1, wherein said coating agent is selected from the group consisting of sodium silicate, sodium carbonate, sodium sulfate, magnesium sulfate, sodium borate, boric acid and mixtures thereof.

4. The process according to claim 2, wherein said coating agent is selected from the group consisting of sodium silicate, sodium carbonate, sodium sulfate, magnesium sulfate, sodium borate, boric acid and mixtures thereof.

5. The process according to claim 1, wherein said coated sodium percarbonate particles produced have a long term stability expressed as heat output at 40° C. of less than 5 μW/g measured after storage during 12 weeks at 40° C.

6. The process according to claim 2, wherein said coated sodium percarbonate particles produced have a long term stability expressed as heat output at 40° C. of less than 5 μW/g measured after storage during 12 weeks at 40° C.

7. The process according to claim 1, wherein said coated sodium percarbonate particles produced have a long term stability expressed as an Avox recovery of at least 70% after storage for 8 weeks at 55° C.

8. The process according to claim 2, wherein said coated sodium percarbonate particles produced have a long term stability expressed as an Avox recovery of at least 70% after storage for 8 weeks at 55° C.

9. The process according to claim 1 further comprising:
drying the sodium percarbonate core particles prior to their coating to produce dry core particles,
and
drying the coated sodium percarbonate particles to produce dry coated particles.

10. The process according to claim 9, further comprising sieving at least one of said dry core particles and said dry coated particles in order to remove particles of a size smaller than 300 μm and/or larger than 1800 μm therefrom, followed by milling these removed particles into said particles having a mean particle size smaller than 100 μm.

11. The process according to claim 9, in which at least one additional coating step in a fluid bed is carried out on said coated sodium percarbonate particles.

12. The process according to claim 9, in which drying said sodium percarbonate core particles and/or drying said coated sodium percarbonate particles is carried out in a fluid bed drier using a fluidizing gas, wherein sodium percarbonate particles having of a mean particle size smaller than 100 μm are carried along with the fluidizing gas out of the fluid bed drier and are recycled in said process, optionally after milling.

13. The process according to claim 9, further comprising preparing said sodium percarbonate core particles by mixing a sodium carbonate source with a solution of hydrogen peroxide and by precipitating the formed sodium percarbonate into sodium percarbonate core particles.

14. The process according to claim 1, comprising coating said sodium percarbonate core particles with said at least one solution of said at least one coating agent.

15. The process according to claim 14, wherein said solution is an aqueous solution.

16. The process according to claim 1, comprising coating said sodium percarbonate core particles with said at least one suspension of said at least one coating agent.

17. The process according to claim 1, wherein the coated sodium percarbonate particles produced have a mean particle size of at least 500 μm and at most 1000 μm.

18. The process according to claim 1, wherein the sodium percarbonate core particles have a mean diameter of at least 300 μm and at most 1400 μm.

19. The process according to claim 1, wherein the sodium percarbonate particles having a mean particle size smaller than 100 μm have a mean particle size smaller than 70 μm.

20. The process according to claim 19, wherein the sodium percarbonate particles having a mean particle size smaller than 70 μm have a mean particle size of at least 5 μm.

21. The process according to claim 1, wherein the content of sodium percarbonate particles having a mean particle size smaller than 100 μm in the coating layer is at least 10% by weight and at most 40% by weight.

22. The process according to claim 20, wherein the content of sodium percarbonate particles having a mean particle size smaller than 100 μm in the coating layer is at least 10% by weight and at most 40% by weight.

* * * * *